No. 892,774. PATENTED JULY 7, 1908.
E. L. THOMAS.
PLOW TONGS.
APPLICATION FILED DEC. 10, 1907.

Inventor
E. L. Thomas.

Witnesses
F. E. Gibson.
P. M. Smith.

By Victor J. Evans
Attorney

UNITED STATES PATENT OFFICE.

EDMON L. THOMAS, OF ALMA, ILLINOIS.

PLOW-TONGS.

No. 892,774.　　　　Specification of Letters Patent.　　　Patented July 7, 1908.

Application filed December 10, 1907. Serial No. 405,922.

*To all whom it may concern:*

Be it known that I, EDMON L. THOMAS, a citizen of the United States, residing at Alma, in the county of Marion and State of Illinois, have invented new and useful Improvements in Plow-Tongs, of which the following is a specification.

This invention relates to plow tongs and the object of the invention is to provide a simple and effective hand implement for handling plow shares so as to firmly clamp and hold the share and bar while the latter are being operated upon, as for example, while molding the share and bar together or while sharpening the edge or point of the share or in the original manufacture or subsequent repair of the share.

With the above object in view, the invention consists in the novel construction, combination and arrangement of parts hereinafter fully described, illustrated and claimed.

Figure 1:
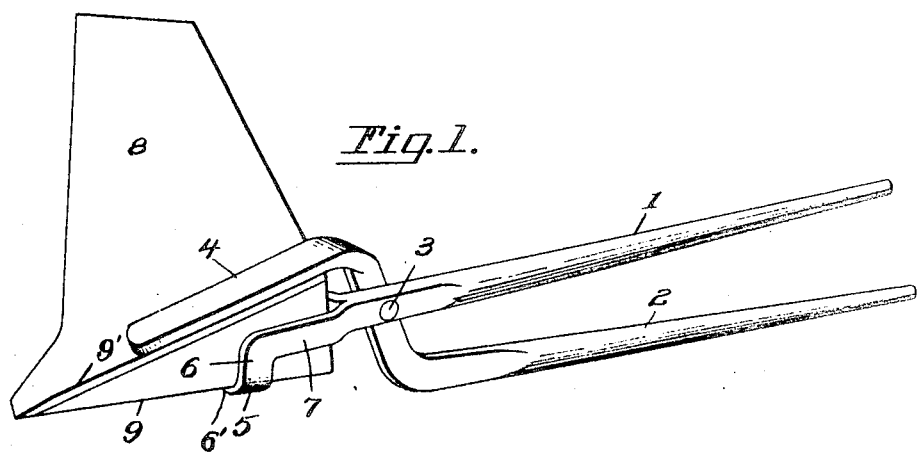
Figure 2:
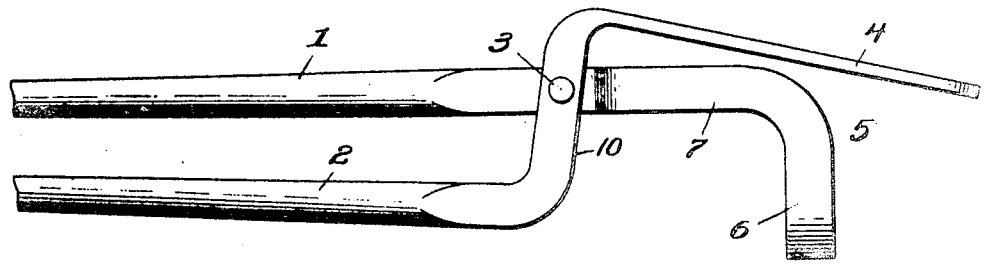
Figure 3:
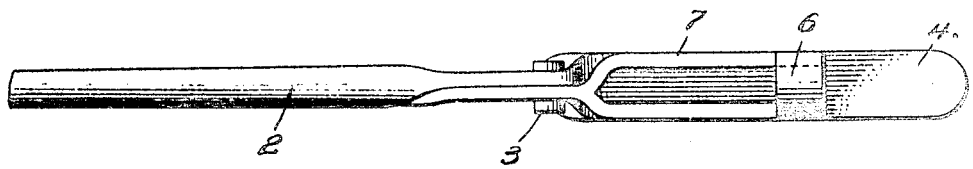

In the accompanying drawing:—Figure 1 is a perspective view of the plow tongs showing a plow share and bar held thereby. Fig. 2 is a plan view of the tongs. Fig. 3 is an edge view of the same.

The plow share tongs of my invention consist of a pair of handles 1 and 2 which are crossed and pivotally connected together by a bolt 3, said handles being flattened midway of their lengths, so as to provide suitable jaws 4 and 5 for the purpose of properly handling plow shares. The flattened portion of the handle 1 forms the jaw 5 which is bifurcated as shown at 7, the ends 6 of which are bent downwardly at right angles therewith and provided with a transverse curved seat 6', as shown in Fig. 1. The other flattened portion of the handle is provided with an upwardly projecting flattened extension 10, which is pivoted to the flattened portion of the handle 1. The upper end of said extension is twisted to form a forwardly and downwardly inclined flattened jaw 4. By means of constructing the jaws 4 and 5 as above described, the tongs is capable of handling a plow share when connected thereto and preventing the same from becoming detached therefrom. It will be readily seen that the bifurcated portion of the jaw 7 straddles the rear end of the plow share 8, while its downwardly bent ends serve to contact with the opposite sides of the same, the seat 6' of said ends serving to contact with the lower edge 9 of said share. I attach importance to the forwardly and downwardly inclined jaw 4, of the handle 2, which is elongated so as to extend approximately one half of its length beyond the bifurcated jaw 5, said elongation of the jaw permitting of its contacting its entire length flush with the flange 9' of the plow share so as to permit of equalizing the weight of the share on said seat 6'.

I claim:—

A tongs for handling plow shares comprising handles which are crossed and pivotally connected together, said handles being flattened midway of their lengths, and one of the flattened portions of one of the handles having a bifurcated jaw, the ends of which are bent downwardly at right angles therewith and having a transverse curved seat secured to the terminals of said ends, the other flattened portion of the other handle having an angular upwardly projecting extension the upper end of which is twisted to form a forwardly and downwardly inclined jaw, said bifurcated portion of the first mentioned jaw and its downwardly bent ends serving to contact with the opposite side portions of a plow share with the lower edge of the share mounted in the curved seat of said arms, and said forwardly and downwardly inclined jaw being elongated so as to extend approximately one-half of its length beyond said bifurcated jaw and serving to contact with the flange of the share so as to equalize the weight of the share on the curved seat, substantially as specified.

In testimony whereof I affix signature in presence of two witnesses.

EDMON L. THOMAS.

Witnesses:
H. M. FRAMPTON,
E. S. CROOKER.